(12) United States Patent
Jonas

(10) Patent No.: US 9,156,066 B2
(45) Date of Patent: Oct. 13, 2015

(54) APERTURE CLEANING SYSTEM AND METHODS OF USE

(75) Inventor: Matthew Jonas, Allen, TX (US)

(73) Assignee: RAYTHEON COMPANY, Waltham, MA (US)

( * ) Notice: Subject to any disclaimer, the term of this patent is extended or adjusted under 35 U.S.C. 154(b) by 857 days.

(21) Appl. No.: 13/220,248

(22) Filed: Aug. 29, 2011

(65) Prior Publication Data
US 2013/0048036 A1    Feb. 28, 2013

(51) Int. Cl.
*B05B 15/06* (2006.01)
*B08B 3/02* (2006.01)
*G02B 27/00* (2006.01)

(52) U.S. Cl.
CPC . *B08B 3/02* (2013.01); *B05B 15/06* (2013.01); *G02B 27/0006* (2013.01)

(58) Field of Classification Search
CPC ............ B08B 3/02; B08B 3/04; B08B 9/093; B08B 3/024; B08B 9/00; B05B 15/10
USPC ...... 134/167 R, 22.1, 172, 198, 181, 34, 123; 15/250.01, 250.002, 250.04, 313; 239/284.2, 284.1, 197, 204, 205, 280, 239/288.5, 456, 458, 532
See application file for complete search history.

(56) References Cited

U.S. PATENT DOCUMENTS

| | | | |
|---|---|---|---|
| 4,331,295 A * | 5/1982 | Warihashi | 239/284.1 |
| 4,752,032 A | 6/1988 | Costa et al. | |
| 5,269,464 A | 12/1993 | Epple et al. | |
| 5,657,929 A * | 8/1997 | DeWitt et al. | 239/284.2 |
| 6,739,521 B2 * | 5/2004 | Bandemer et al. | 239/284.2 |
| 6,854,666 B2 | 2/2005 | Jenkins | |
| 7,448,554 B2 | 11/2008 | Sakai et al. | |
| 7,669,786 B2 | 3/2010 | Semmelroth et al. | |
| 2005/0086758 A1 * | 4/2005 | Arkashevski et al. | 15/250.02 |
| 2005/0099433 A1 | 5/2005 | Berson et al. | |
| 2006/0113404 A1 * | 6/2006 | Sato et al. | 239/284.2 |

FOREIGN PATENT DOCUMENTS

| | | | | |
|---|---|---|---|---|
| EP | 1149745 A1 * | 2/2001 | | B60S 1/08 |
| FR | 2657057 | * | 7/1991 | B60S 1/52 |

OTHER PUBLICATIONS

English Machine Translation of Description of FR2657057 (Beaulieu, 1991).*
English Machine Translation of Descriptoion of EP1149745A1 (Braeuchle et al. 2001).*

* cited by examiner

*Primary Examiner* — David Cormier
*Assistant Examiner* — Irina Graf
(74) *Attorney, Agent, or Firm* — Lando & Anastasi, LLP

(57) ABSTRACT

A sensor aperture cleaning system includes a fluid dispensing arm movable between a stowed position in which the fluid dispensing arm is outside a field of view of a sensor aperture and a cleaning position in which the fluid dispensing arm is disposed within the field of view of the sensor aperture. The system further comprises a piston mechanism, a housing sized to slidably receive the piston mechanism, and a biasing member disposed within the housing and configured to bias the piston mechanism. The piston mechanism is coupled to the fluid dispensing arm and is configured to move the fluid dispensing arm from the stowed position to the cleaning position in response to pressure on the piston mechanism from a pressurized fluid.

11 Claims, 13 Drawing Sheets

APERTURE CLEANING SYSTEM AND METHODS OF USE

BACKGROUND

A combat vehicle typically has one or more sensor packages mounted on or within the vehicle. The sensor package includes a sensor system and a sensor aperture through which the sensor system has a field of view. In combat or other information gathering situations, the sensor system may obtain location information, surrounding environment information, target identification information, or other information from its field of view. The sensor system may also be used to sight on a target for long-range firing or other purposes from its field of view. As the vehicle moves through its surrounding environment, the sensor aperture may collect debris and foreign material, such that the field of view of the sensor system is obstructed, which may impact usability of any information gathered from the sensor system. Typically, a cleaning system is fixedly mounted to a surface or adjacent to the sensor aperture outside the vehicle so that debris and foreign material can be removed from the sensor aperture by spraying a cleaning fluid on the sensor aperture from a fixed nozzle or wiping the sensor aperture with a wiper. Fixed nozzle cleaning systems may not adequately clean the sensor aperture since the fixed nozzles have limited spraying areas, and wiper cleaning systems may scratch the sensor apertures, diminishing the field of view from the sensor aperture. Wiper cleaning systems also often require complex mechanisms and motors to provide adequate cleaning. Further, both fixed nozzle cleaning systems and wiper cleaning systems mountings may obstruct the field of view from the sensor aperture, and require structure that undesirably extends beyond a hull of the vehicle. Accordingly, although existing systems and methods for cleaning sensor apertures have been generally adequate for their intended purposes, they have not been entirely satisfactory in all respects.

BRIEF DESCRIPTION OF THE DRAWINGS

The accompanying drawings illustrate embodiments of the devices and methods disclosed herein and together with the description, serve to explain the principles of the present disclosure.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting.

Figure 1A:
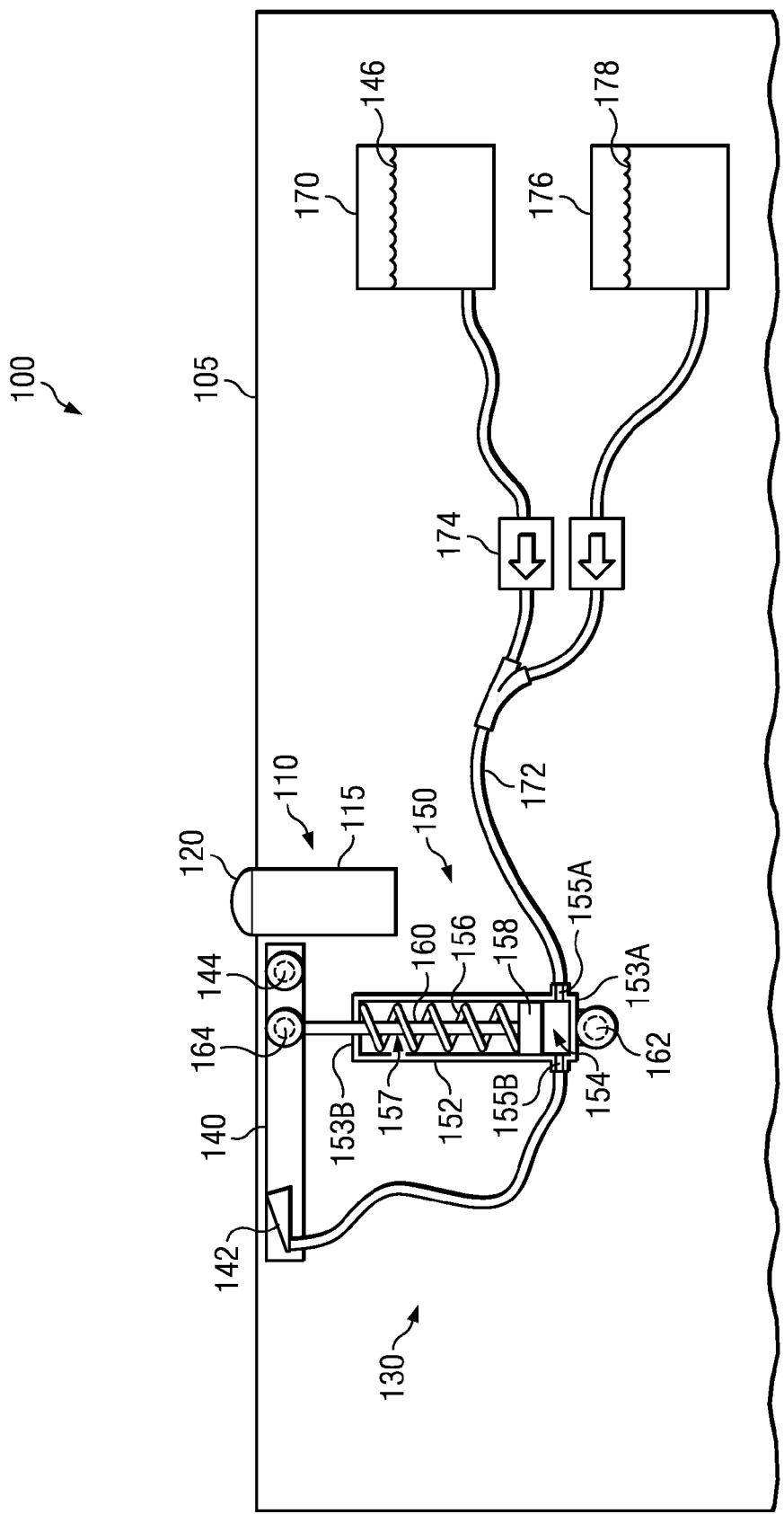
FIGS. 1A and 1B are diagrammatic cross-sectional views of a portion of a vehicle that includes a vehicle aperture cleaning system in a stowed position and a cleaning position, respectively, according to one embodiment of the disclosure.
Figure 1B:
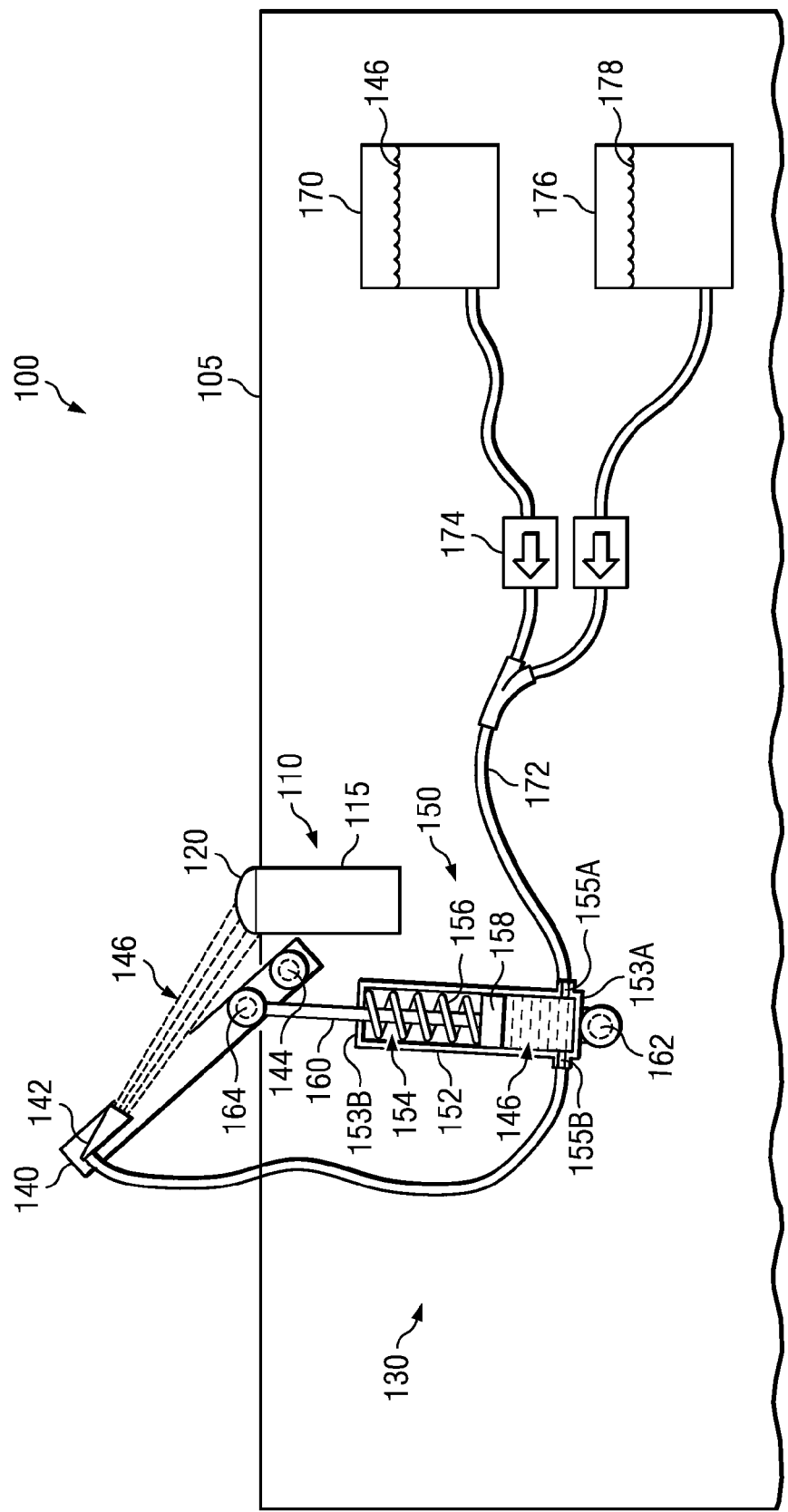

FIG. 1A and FIG. 1B are diagrammatic cross-sectional views of a portion of a vehicle 100 that includes a vehicle aperture cleaning system according to various aspects of the present disclosure. The vehicle 100 is any type of land-based vehicle, aircraft, or watercraft. In the depicted embodiment, the vehicle is a land-based combat vehicle. In FIG. 1A, the vehicle aperture cleaning system is in a stowed position, such that the vehicle aperture cleaning system does not obstruct any view from an aperture of the vehicle. In FIG. 1B, the vehicle aperture cleaning system is in a cleaning position, such that the vehicle aperture cleaning system cleans and removes debris from the aperture. FIGS. 1A and 1B will be collectively described below and are not comprehensive diagrams of the vehicle 100 including the vehicle aperture cleaning system. Instead, for simplicity and clarity, FIGS. 1A and 1B show only selected portions of the overall vehicle 100, including the vehicle aperture cleaning system, that facilitate an understanding of aspects of the present disclosure. In certain embodiments, as will be described below, the vehicle aperture may be a sensor aperture. However in alternative embodiments, the vehicle aperture may be any other type of vehicle aperture that may be remotely cleaned, including a window, a lamp, a lens, a radome, or an output aperture. In other alternative embodiments, the non-contact aperture cleaning systems of this disclosure may be used on stationary structures such as buildings, towers, or anything comprising an aperture.

The portion of the vehicle 100 is a vehicle hull 105 that includes a sensor package 110. The sensor package 110 may be a part of a distributed aperture system (DAS). The DAS provides a collection of sensors mounted either around the vehicle 100 or co-located in one location of the vehicle 100, such that an unobstructed 360° line-of-sight (or other field of view requiring more than one sensor) can be obtained. The sensor package 110 includes a sensor system 115 and a sensor aperture (or window) 120 through which the sensor system 115 has a field of view. The sensor system 115 includes one or more sensors, such as electro-optical infrared sensors. The sensor system 115 may include, for example, an infrared (IR) imaging system, such as a forward looking IR (FLIR) imaging system, which includes an IR sensor. An IR imaging system may generate a video output that can be used to assist an operator of the vehicle 100 view the surroundings of the vehicle 100. The sensor system 115 may also include, for example, a daylight television imaging system. Other types of electro-optical, laser, radar, thermal, or other energy based imaging systems may be incorporated into the sensor system 115. Images from any and all of the imaging systems may be viewed on a display system within the vehicle 100. The sensor system 115 may also include optical and electronic equipment for the imaging systems.

As noted, the sensor system 115 has a field of view through the sensor aperture 120, which is transparent. In the depicted embodiment, the sensor aperture 120 is disposed near an edge of the vehicle hull 105. Debris and foreign material may build up on the sensor aperture 120, particularly on a surface of the sensor aperture 120 disposed at the edge of the vehicle hull 105. Such debris can obstruct the field of view of the sensor system 115 through the sensor aperture 120.

The vehicle aperture cleaning system 130 is included in the vehicle hull 105. The vehicle aperture cleaning system 130 is configured to clean the sensor aperture 120, so that debris and foreign material can be removed from the sensor aperture 120. The vehicle aperture cleaning system 130 includes a fluid dispensing arm 140 adjacent to the sensor package 110. The fluid dispensing arm 140 is pivotably attached to the vehicle hull 105 at articulation point 144. The fluid dispensing arm 140 may be moved relative to the sensor aperture 120 about articulation point 144, such that the fluid dispensing arm 140 is moved in any direction relative to the sensor aperture 120. In the stowed position (FIG. 1A), the fluid dispensing arm 140 of the vehicle aperture cleaning system 130 is recessed within the vehicle hull 105, behind the sensor aperture 120. When not needed for cleaning, the vehicle aperture cleaning system 130 thus does not extend (or protrude) beyond an edge of the vehicle hull 105 and does not block any field of view from the sensor aperture 120. Stowing the vehicle aperture cleaning system 130 within the vehicle 100 and behind the sensor aperture 120 can facilitate placing the sensor aperture 120 at the edge of the vehicle hull 105 (or edge of the vehicle 100), such that ground intercept can be improved. In the cleaning position (FIG. 1B), the fluid dispensing arm 140 of the vehicle aperture cleaning system 130 extends from the vehicle hull 105 in front of the sensor aperture 120. The fluid dispensing arm 140 includes a nozzle 142 that can spray the sensor aperture 120 with fluid. The nozzle 142 may be a fan nozzle or other nozzle. When cleaning the sensor aperture 120, the nozzle 142 in the fluid dispensing arm 140 sprays a cleaning fluid 146 on the sensor aperture 120. As further described below, the position of the fluid dispensing arm 140/nozzle 142 can be adjusted to sweep the cleaning fluid 146 across the sensor aperture 120, spraying the sensor aperture 120 from multiple directions. In an example, the cleaning fluid 146 is water or water mixed with a cleaning solution. The cleaning fluid 146 may be alcohol, antifreeze, or other cleaning solution. The cleaning fluid 146 may be heated, chilled, or maintained at an ambient temperature. The cleaning fluid 146 may be in a liquid or gaseous form.

The vehicle aperture cleaning system 130 further includes a fluid dispensing arm positioning mechanism 150. The fluid dispensing arm positioning mechanism 150 includes a housing 152 having an end 153A and an end 153B. The housing 152 includes a bore 154. In the depicted embodiment, the bore 154 is cylindrically-shaped. The bore 154 may have other shapes. The housing 152 also includes an inlet orifice 155A and an outlet orifice 155B which provide a fluid passage through the housing when the fluid dispensing arm 140 is in the stowed and in the cleaning positions. The inlet and outlet orifices 155A, 155B may have the same size diameter or may have different size diameters. In some embodiments, valves or other types of regulators may be installed to control the flow of fluid through the orifices. A biasing member 156 and a piston mechanism 157, which includes a base member 158 and an elongated coupling member 160, are disposed within the bore 154 of the housing 152. In this embodiment, the biasing member 156 extends between the base member 158 and the housing end 153B. The biasing member 156 is in a relaxed state in FIG. 1A and in a compressed state in FIG. 1B. The elongated coupling member 160 is coupled to and extends between the base member 158 and the fluid dispensing arm 140. In this embodiment the biasing member is a spring, but in alternative embodiments other types of biasing members such as elastomeric materials may serve as a biasing member.

The fluid dispensing arm positioning mechanism 150 is pivotably attached to the vehicle hull 105 at articulation point 162. The fluid dispensing arm positioning mechanism 150 may be moved relative to the vehicle hull 105 about the articulation point 162, such that the fluid dispensing arm positioning mechanism 150 is moved in any direction relative to the vehicle hull 105. The fluid dispensing arm positioning mechanism 150 is also pivotably attached to the fluid dispensing arm 140 at articulation point 164. In the depicted embodiment, the elongated coupling member 160 of the fluid dispensing arm positioning mechanism 150 is pivotably attached to the fluid dispensing arm 140 at the articulation point 164.

The fluid dispensing arm 140 may be moved relative to the fluid dispensing arm positioning mechanism 150 about articulation point 164, such that the fluid dispensing arm positioning mechanism 150 can move the fluid dispensing arm 140 in any direction.

In an alternative embodiment, the fluid dispensing arm may be omitted and the nozzle located at another recessed and movable area of the system. For example, the nozzle may be positioned on the end of the tubular piston mechanism, opposite the base member. In this embodiment, the orifice 155B may continue to control fluid flow to the nozzle, however the path of the fluid after the orifice 155B would be routed through the tubular piston mechanism.

The vehicle aperture cleaning system 130 further includes a fluid supply system 170 that contains the cleaning fluid 146. A fluid line 172 is in fluid communication with the fluid supply system 170, the fluid dispensing arm positioning mechanism 150 (specifically the bore 154 of the fluid dispensing arm positioning mechanism 150), and the fluid dispensing arm 140. The fluid line 172 is connected to the inlet orifice 155A and to the outlet orifice 155B. The fluid line 172 is configured to deliver the cleaning fluid 146 to the fluid dispensing arm 140, particularly the nozzle 142, such that the cleaning fluid 146 can be sprayed on the sensor aperture 120. A valve 174, such as a check valve, ensures that the cleaning fluid 146 flows from the fluid supply system 170 to the fluid dispensing arm 140. In the depicted embodiment, a pressure is applied to the cleaning fluid 146, such that the cleaning fluid 146 is pressurized as it flows from the fluid supply system 170 to the fluid dispensing arm positioning mechanism 150 to the fluid dispensing arm 140.

Optionally, the vehicle aperture cleaning system 130 may include a secondary fluid supply system 176 that contains a fluid 178. The fluid 178 may be the same or different than the fluid 146. The fluids 146, 178 may be selected for different types of cleaning needs or different environmental conditions, such as temperature. Alternatively, the fluids 146, 178 may be mixed in predetermined or user selectable ratios to create a combined fluid.

The pressurized cleaning fluid 146 is used for both cleaning the sensor aperture 120 and actuating the fluid dispensing arm positioning mechanism 150. For example, as the cleaning fluid 146 flows from the fluid supply system 170 to the fluid dispensing arm 140, more cleaning fluid 146 flows into the bore 154 of the fluid dispensing arm positioning mechanism 150 from the fluid supply system 170 than flows out of the bore 154 to the fluid dispensing arm 140. Accordingly, cleaning fluid fills the bore 154 of the fluid dispensing arm positioning mechanism 150 (FIG. 1B) and exerts pressure on the base member 158 of the fluid dispensing arm positioning mechanism 150. The pressure exerted on the base member 158 by the cleaning fluid 146 can overcome a spring bias of the spring 156 and cause the spring 156 to change from a relaxed state (FIG. 1A) to a compressed state (FIG. 1B). As the spring 156 compresses or contracts, the base member 158 changes position within the bore 154, such that the cleaning fluid 146 causes the base member 158 to move toward end 153B of the housing 152. The elongated coupling member 160 moves along with the base member 158, causing the elongated coupling member 160 of the fluid dispensing arm positioning mechanism 150 to move the fluid dispensing arm 140 outside the vehicle hull 105 and in front of the sensor aperture 120. The cleaning fluid 146 spraying from the nozzle 142 of the fluid dispensing arm 140 can thus spray the sensor aperture 120, thus cleaning the sensor aperture 120. By using the pressurized cleaning fluid 146 for both cleaning the sensor aperture 120 and actuating the fluid dispensing arm positioning mechanism 150, complexity, cost, and interfaces (such as power and controls) of the vehicle aperture cleaning system 130 can be reduced.

Figure 2:
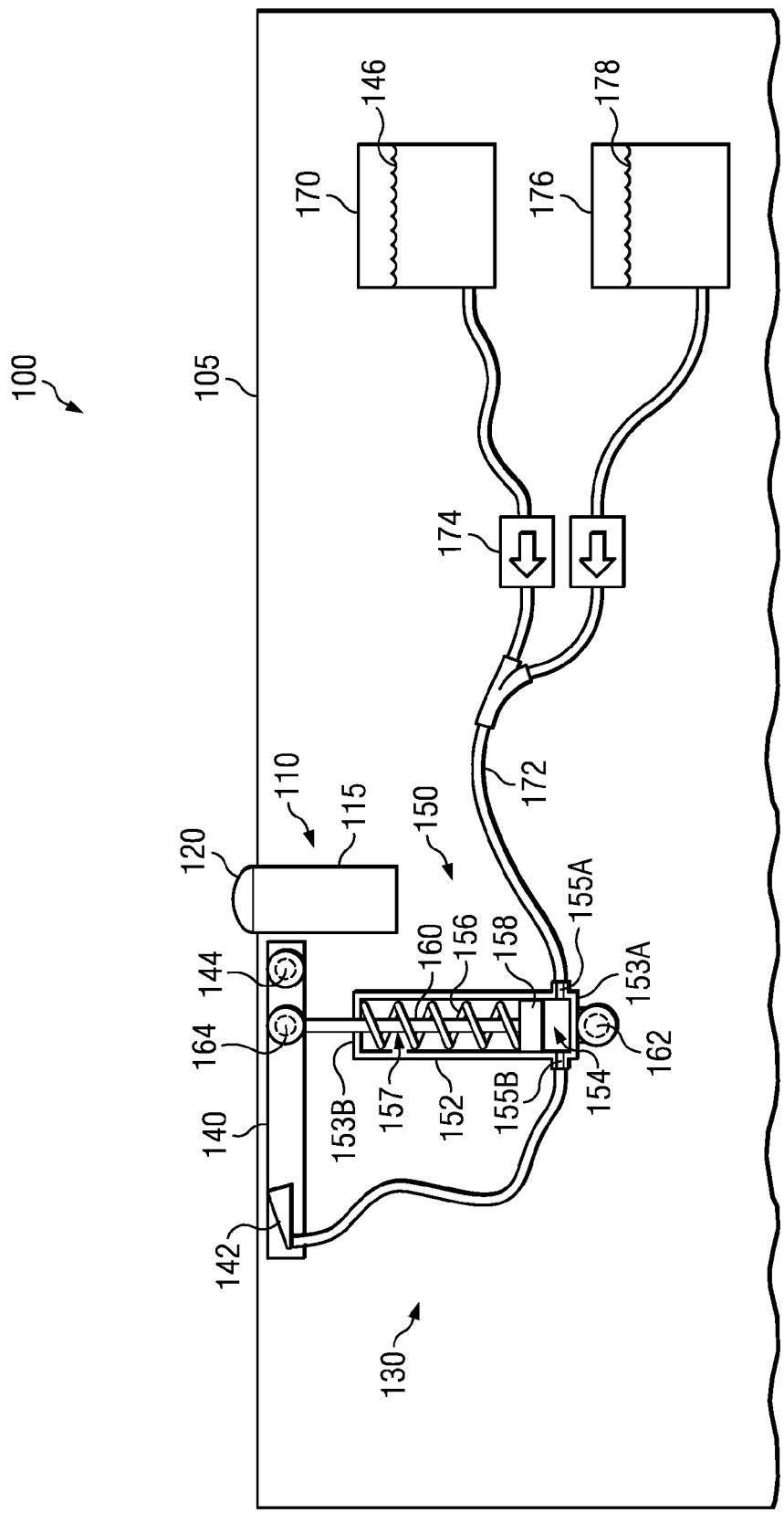
FIGS. 2-11 are diagrammatic cross-sectional views of the portion of the vehicle that include the vehicle aperture cleaning system during a cleaning process according to one embodiment of the disclosure.
Figure 3:
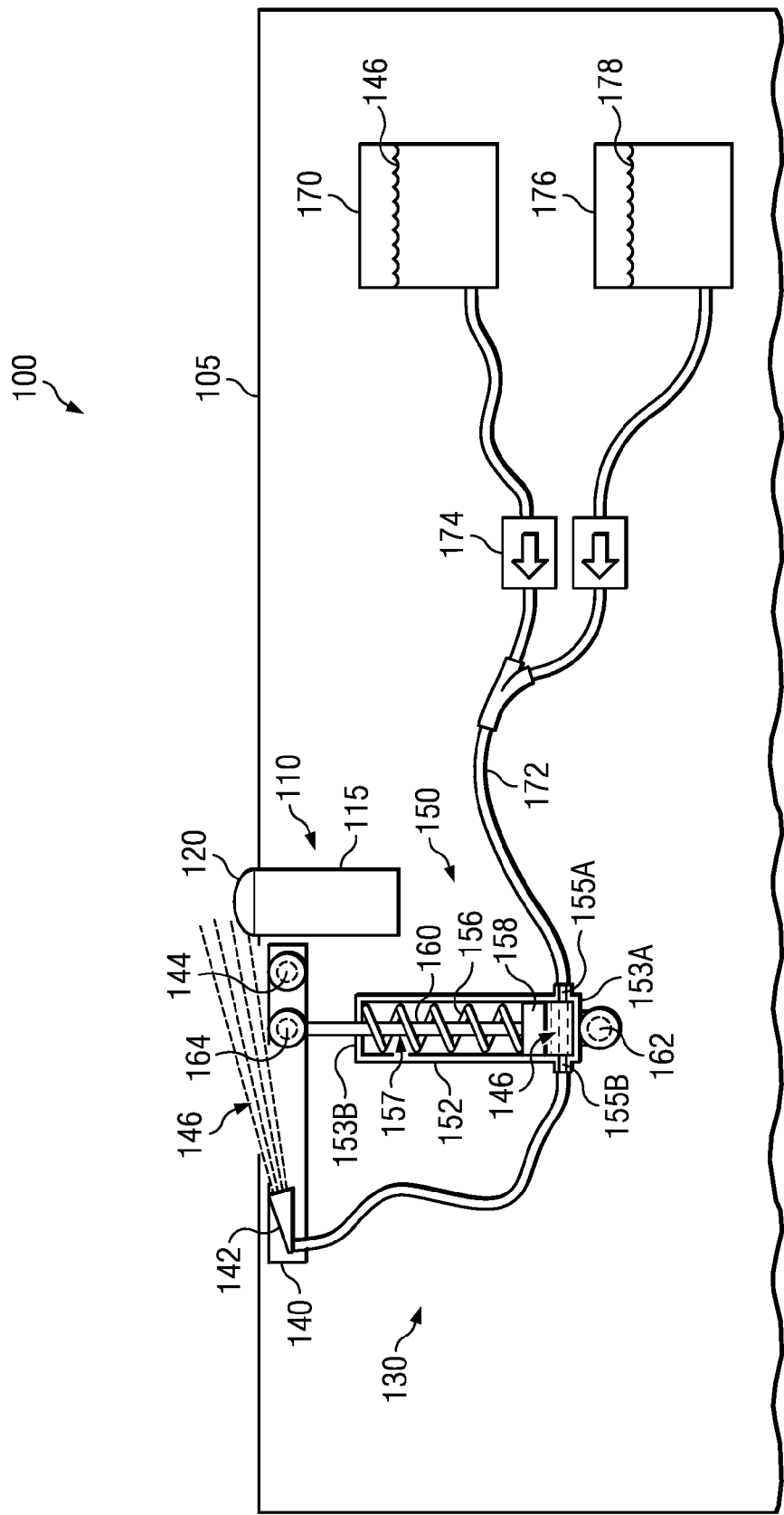
Figure 4:
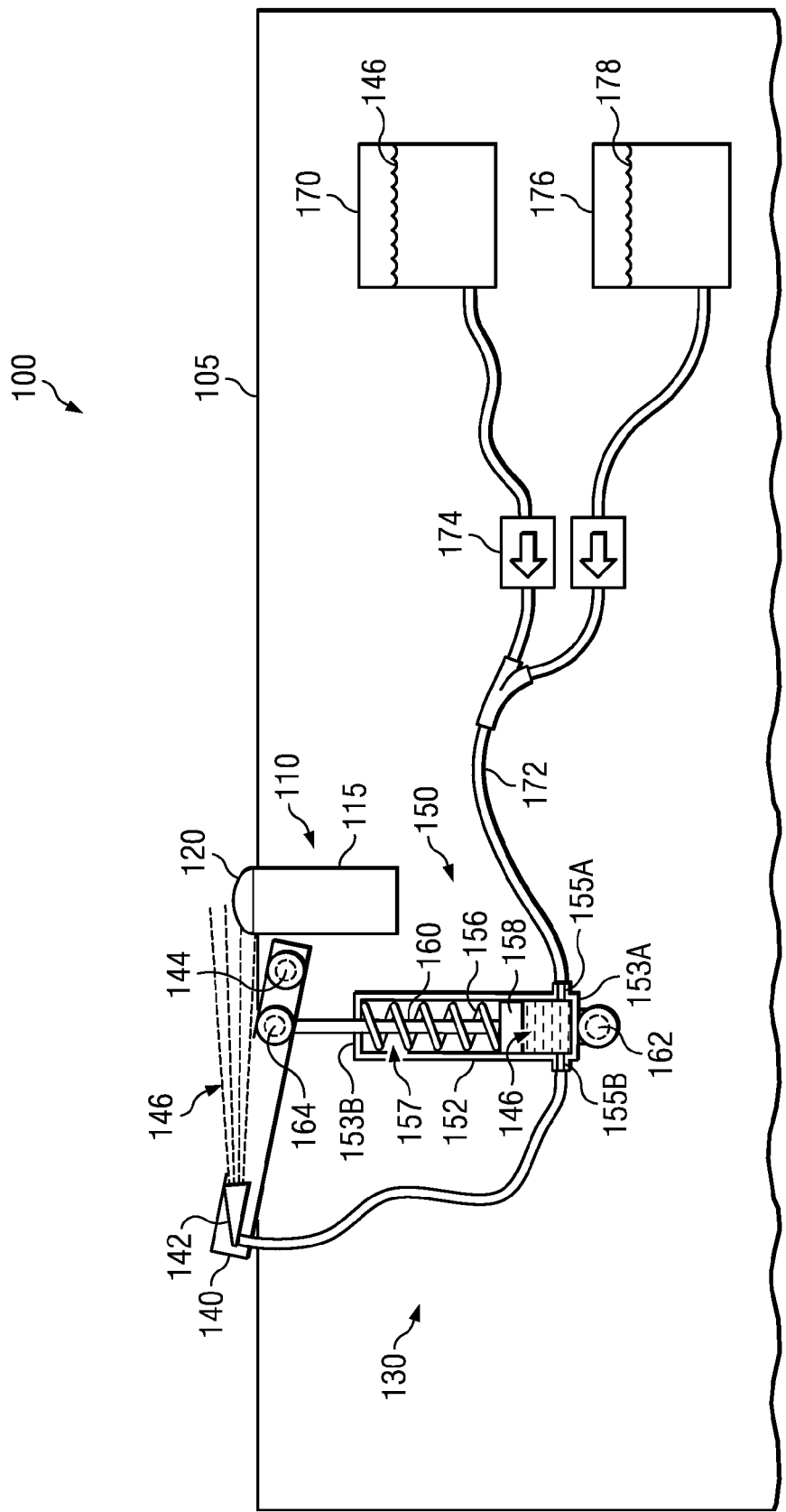
Figure 5:
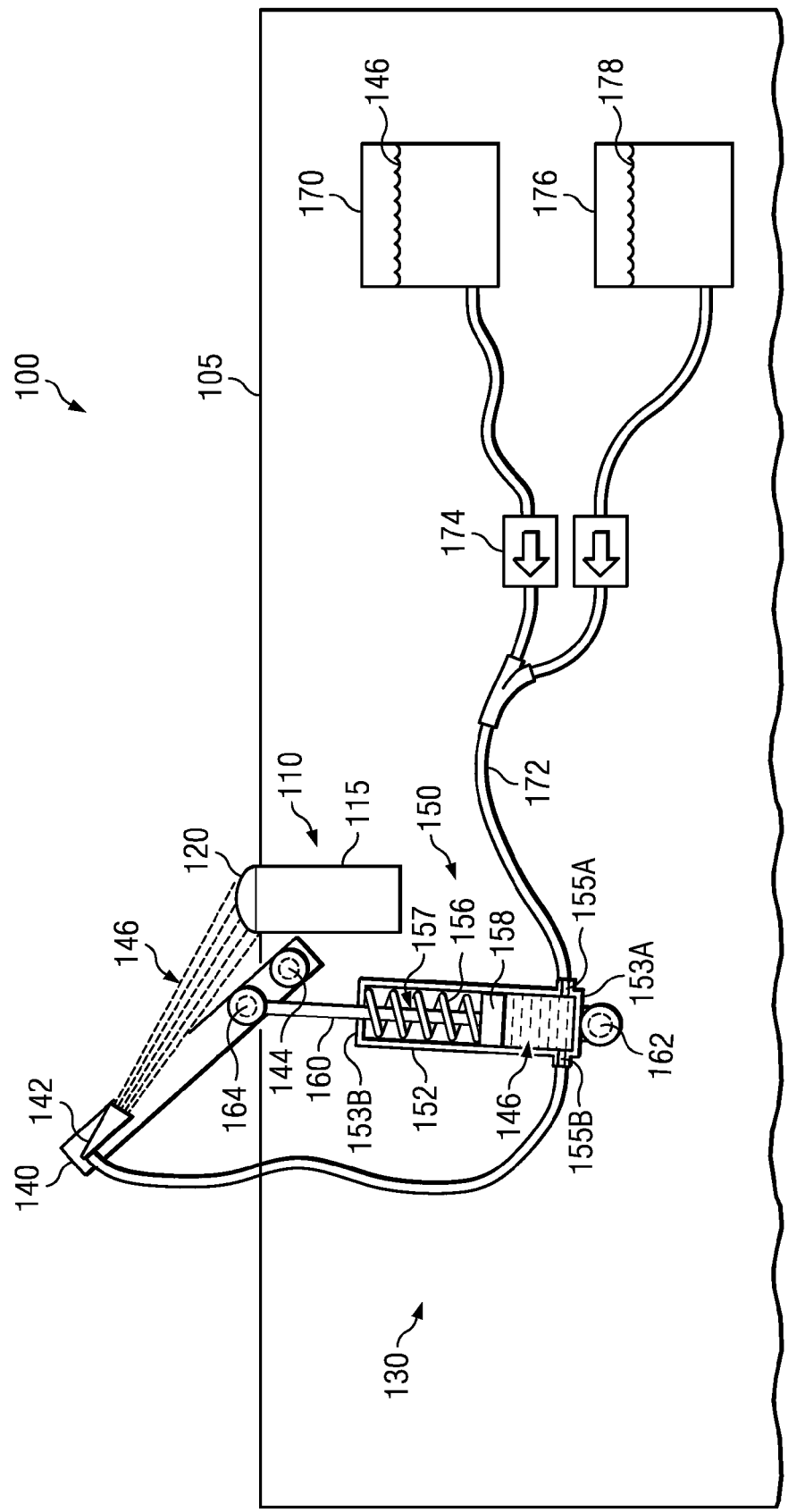
Figure 6:
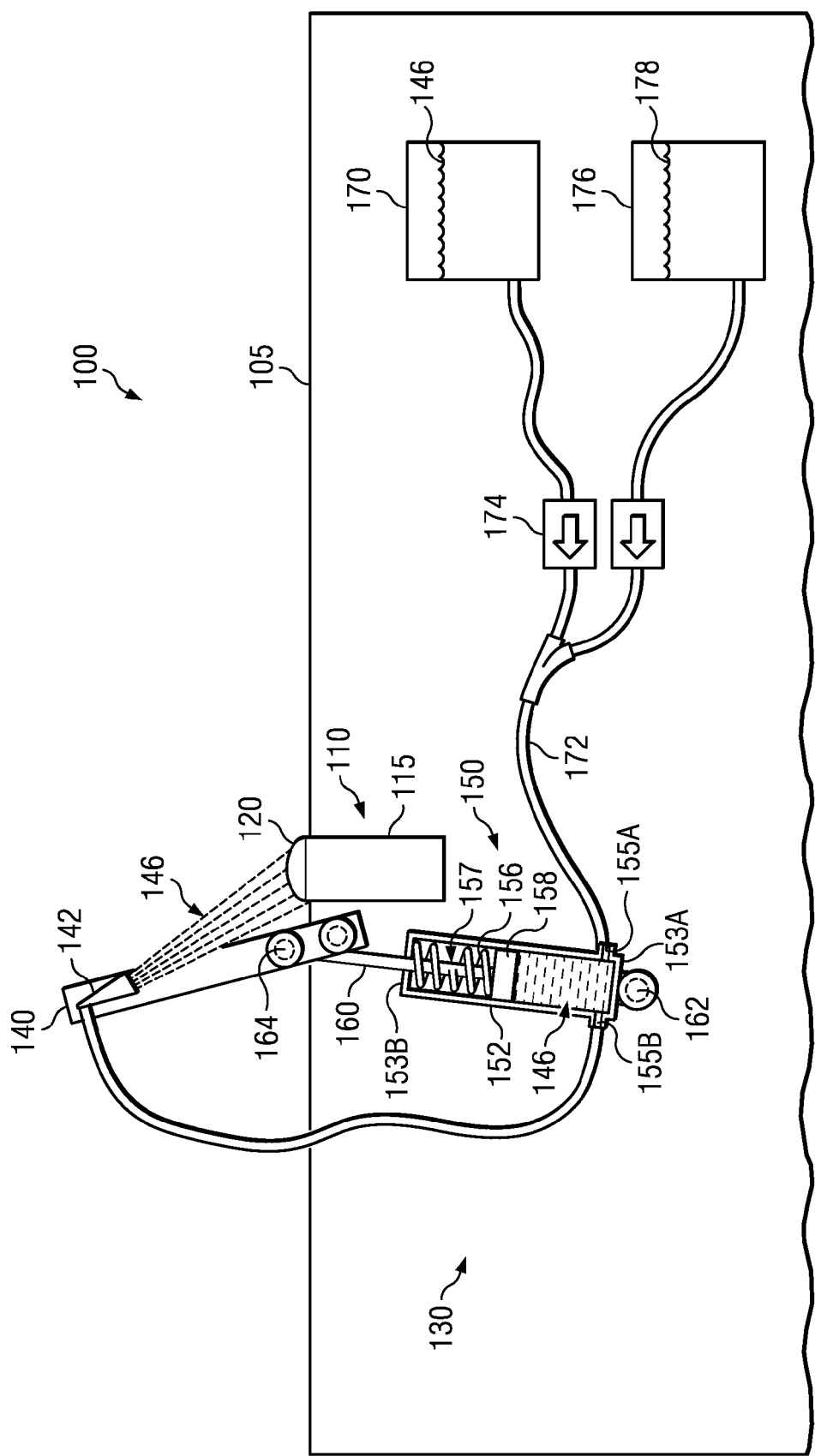
Figure 7:
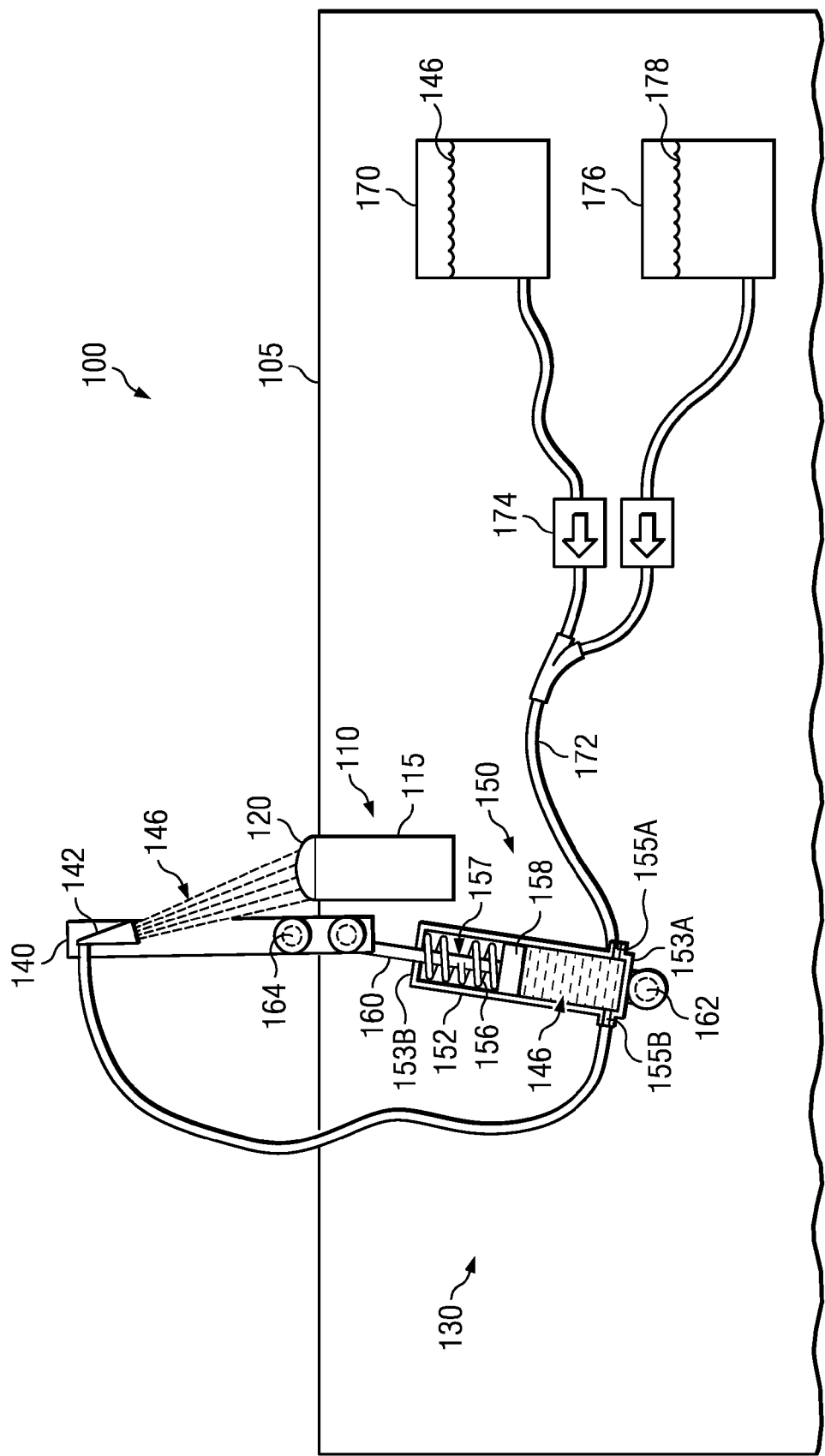
Figure 8:
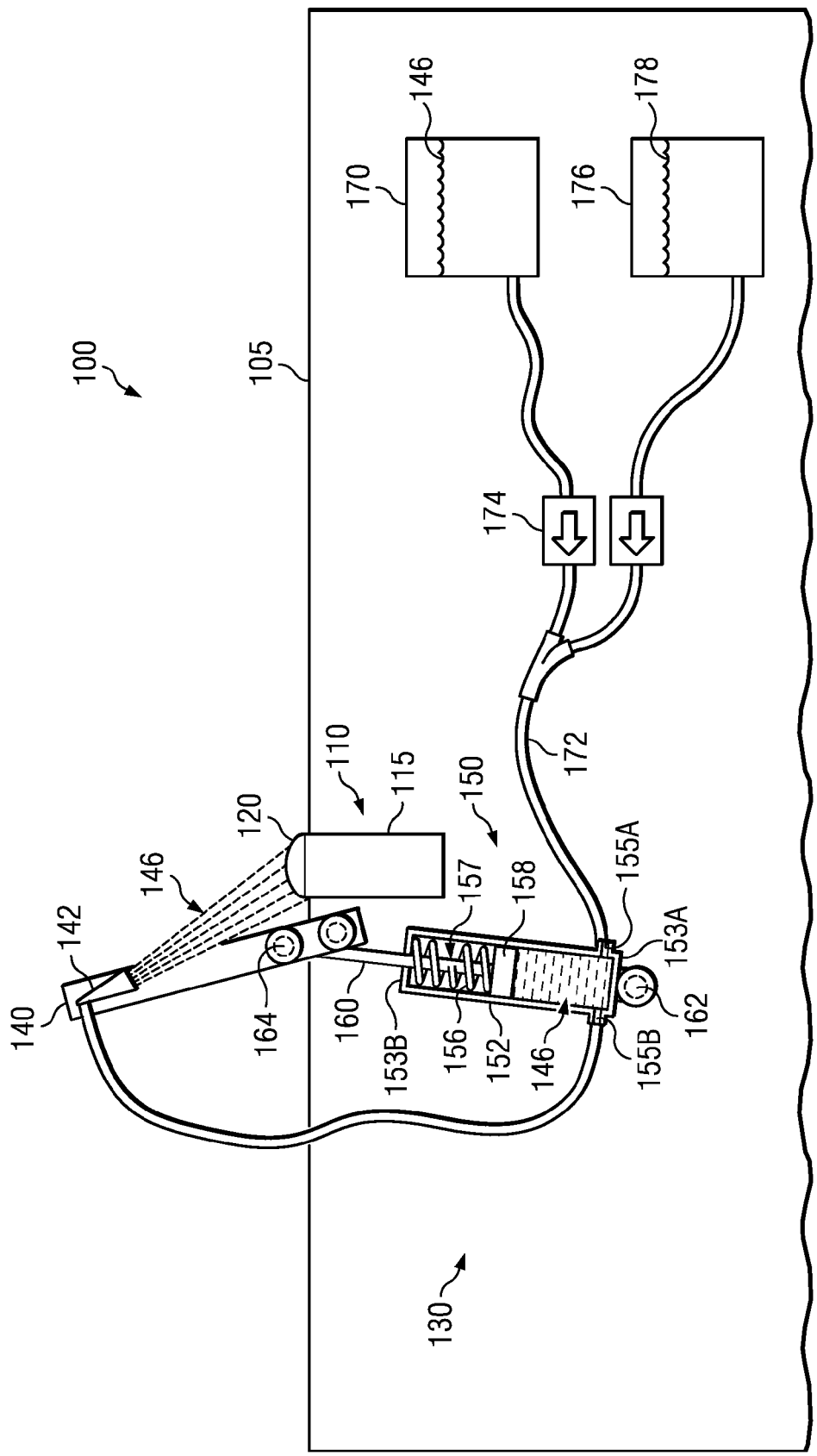
Figure 9:
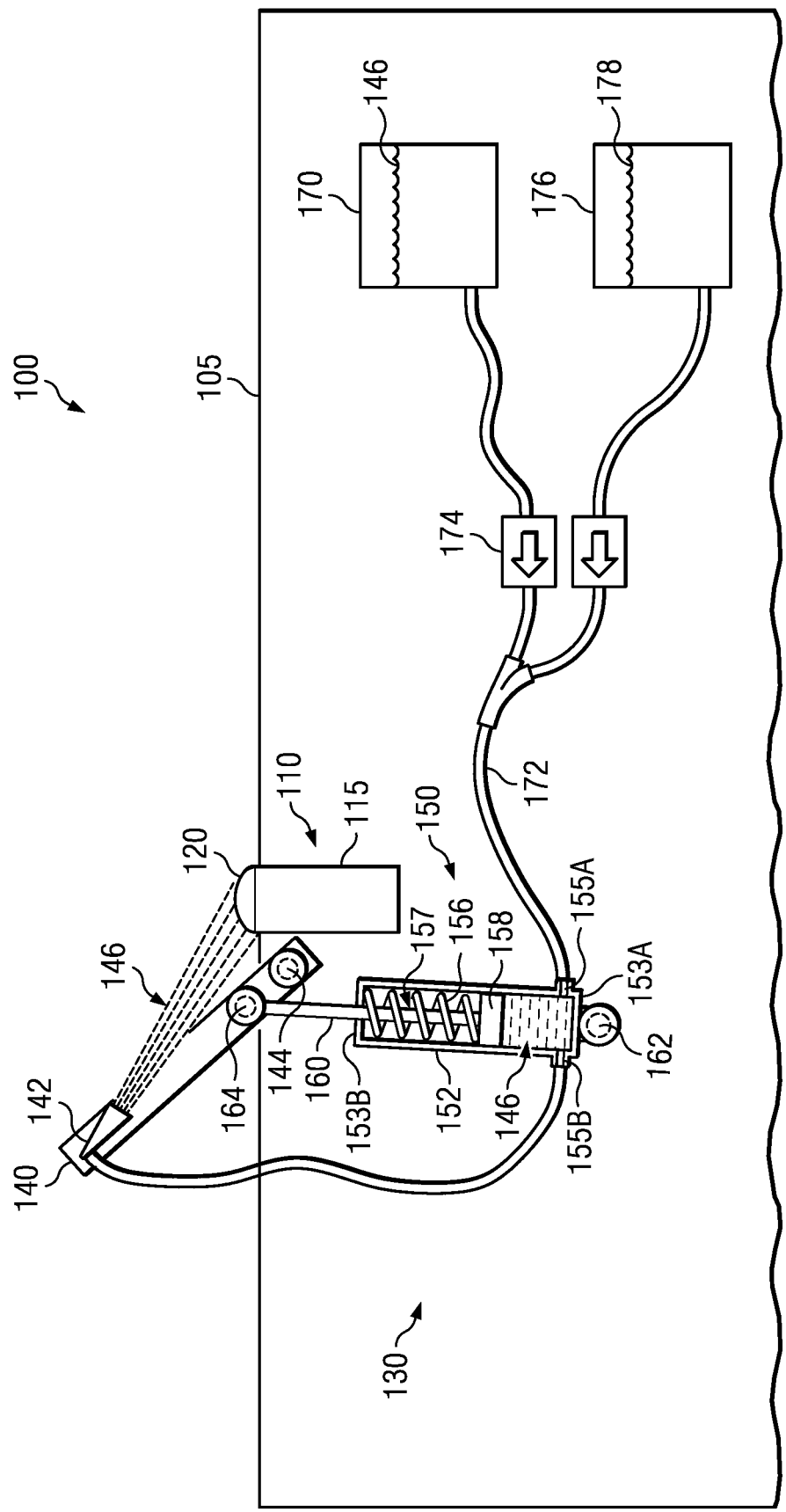
Figure 10:
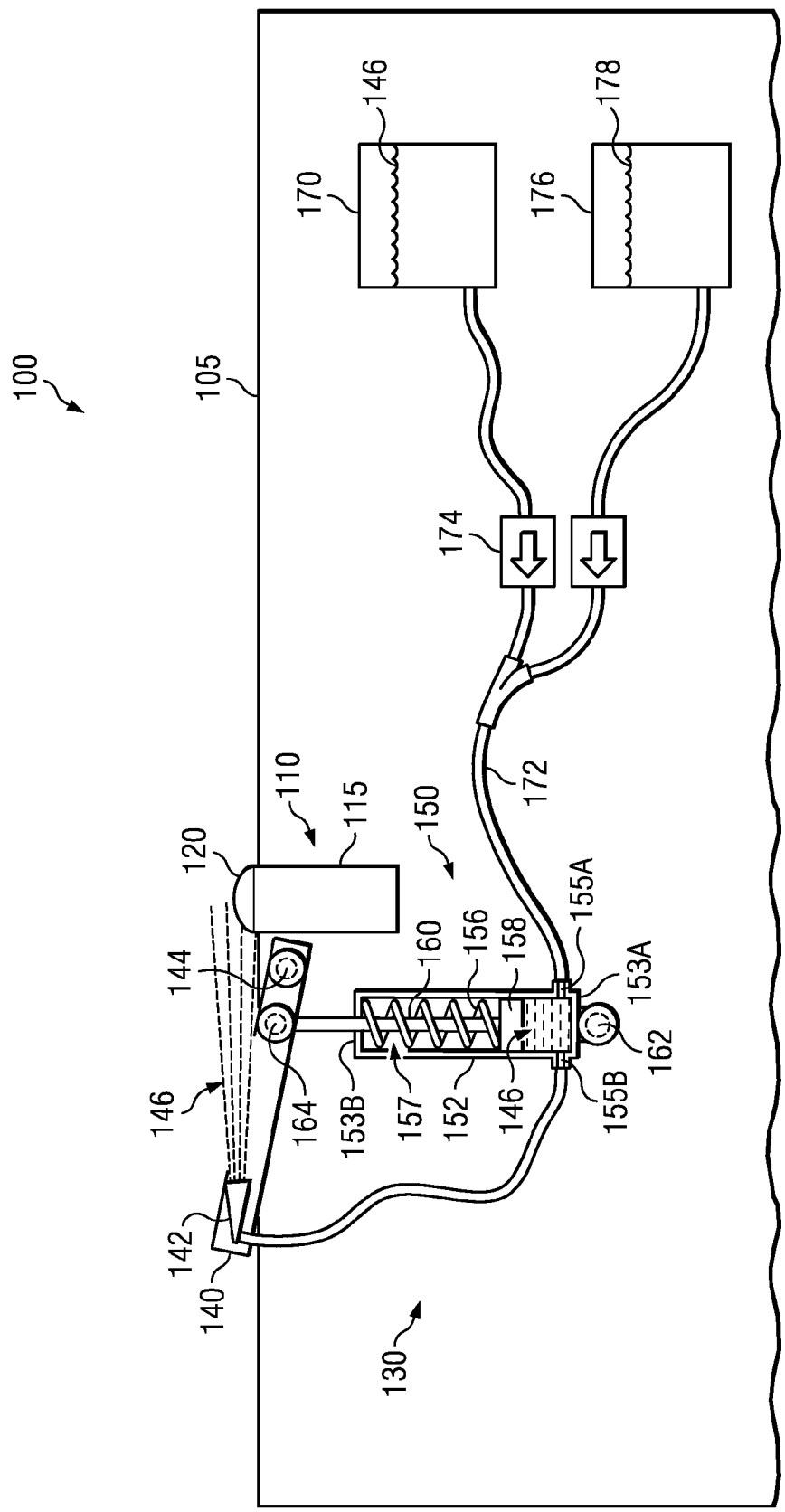

FIGS. 2-11 are diagrammatic cross-sectional views of the portion of the vehicle 100 that includes the vehicle aperture cleaning system 130 during a cleaning process according to various aspects of the present disclosure. In FIG. 2, the vehicle aperture cleaning mechanism 130 is in a stowed position, where the vehicle aperture cleaning mechanism 130 is disposed within the vehicle hull 105 and behind the sensor aperture 120. In the stowed position, the vehicle aperture cleaning mechanism 130 does not block the field of view from the sensor aperture 120. In FIG. 3, the check valve 174 opens and pressurized fluid begins flowing into the fluid line 172. The pressurized fluid in the fluid line 172 flows from the fluid supply system 170 to the fluid dispensing arm positioning mechanism 150, and the cleaning fluid 146 begins filling the bore 154 of the fluid dispensing arm positioning mechanism 150. The fluid also flows via the outlet orifice 155B and the fluid line 172 from the bore 154 of the fluid dispensing arm mechanism 150 to the nozzle 142 of the fluid dispensing arm 140. The nozzle 142 begins spraying the cleaning fluid 146 on the sensor aperture 120. As noted above, more fluid flows into the bore 154 (from the fluid supply system 170) than out of the bore 154 (to the fluid dispensing arm 140) and thus, the cleaning fluid 146 begins filling the bore 154 against the base member 158 held in position by pressure from the spring 156. In FIG. 4, as the cleaning fluid 146 continues to fill the bore 154 of the fluid dispensing arm positioning mechanism 150, the cleaning fluid 146 exerts pressure on the base member 158, which pressure overcomes the spring bias of the spring 156, causing the spring 156 to contract from its relaxed state. As the spring 156 contracts, the base member 158 (along with the elongated coupling member 160) begins moving toward end 153B of the housing 152. The movement of the spring 156, base member 158, and elongated coupling member 160 causes the fluid dispensing arm 140 to move. For example, the fluid dispensing arm 140 moves along articulation points 144 and 164 and begins extending (or protruding) outside the vehicle 100 and in front of the sensor aperture 120, such that the nozzle 142 sprays the sensor aperture 120 from a different angle and position. In FIGS. 5-7, the cleaning fluid 146 continuously fills the bore 154 of the fluid dispensing arm positioning mechanism 150, such that the spring 156 contracts further, and the base member 158 continues to move towards end 153B of the housing 152, causing elongated coupling member 160 to move the fluid dispensing arm 140 through various positions in front of the sensor aperture 120. The housing 152 may also pivot about articulation point 162. The nozzle 142 of the fluid dispensing arm 140 thus sweeps the cleaning fluid 146 across the sensor aperture 120. Various orifices of the vehicle cleaning aperture system 130 and the check valve 174 may be used to control a flow of the cleaning fluid 146 to the fluid dispensing arm positioning mechanism 150 (particularly the bore 154) and the fluid dispensing arm 140 (particularly the nozzle 142).

Figure 11:
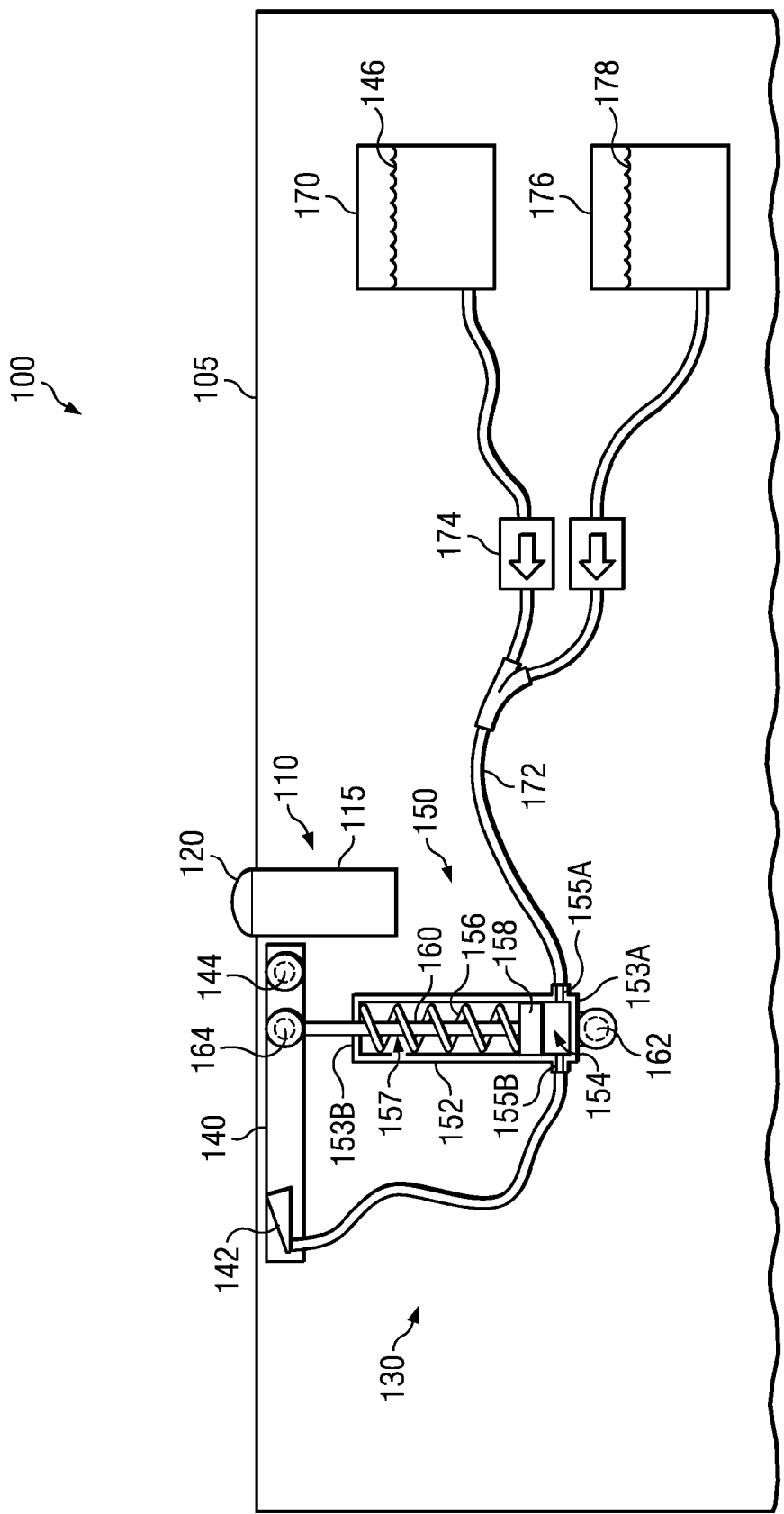

In FIGS. 7-11, the check valve 174 is closed so that the pressurized fluid no longer flows to or from the fluid supply system 170 to the fluid dispensing arm positioning mechanism 150. In FIG. 7, as no more cleaning fluid 146 enters the bore 154 of the fluid dispensing arm positioning mechanism 150 from the fluid supply system 170, the spring 156 begins retracting back to its relaxed state. As the spring 156 retracts, the base member 158 begins moving towards end 153A of the housing 152. The moving base member 158 exerts pressure on the cleaning fluid 146 that remains in the bore 154 of the fluid dispensing arm positioning mechanism 150, causing the cleaning fluid 146 to continue flowing to the nozzle 142 so that the nozzle 142 continues spraying the cleaning fluid 146 on the sensor aperture 120. In FIGS. 8-11, the spring 146 continues to retract and exert pressure on the cleaning fluid 146 within the bore 154, such that the cleaning fluid 146 flows out of the bore 154 to the nozzle 142. As the cleaning fluid 146 leaves the bore 154, the base member 158 continues to move towards end 153A of the housing 152, along with the elongated coupling member 160. As the elongated coupling member 160 retracts back to its original, relaxed position, the elongated coupling member 160 causes the fluid dispensing arm 140 to retract back to its stowed position (FIG. 11). The fluid dispensing arm 140 continues spraying cleaning fluid 146 via the nozzle 142 on the sensor aperture 120 while it contracts back to its stowed position.

In FIGS. 2-11, the vehicle cleaning aperture system 130 sweeps cleaning fluid across the sensor aperture 120 from various directions, using a non-contact cleaning process. For example, as the vehicle cleaning aperture system 130 sprays cleaning fluid 146 on the sensor aperture 120 to clean the sensor aperture 120, the vehicle cleaning aperture system 130, particularly the fluid dispensing arm 140 and nozzle 142, do not contact the sensor aperture 120. The sweeping action of the vehicle cleaning aperture system 130 provides cleaning of the sensor aperture 120 from multiple directions, and can spray a larger area than a fixed nozzle type vehicle cleaning aperture system. Different configurations of the fluid dispensing arm 140, fluid dispensing arm positioning mechanism 150 (such as a length of the housing 152 of the fluid dispensing arm positioning mechanism 150), and articulation points 144, 162, and 164 can be used to adjust and tailor a travel path of the fluid dispensing arm 140. Further, in the depicted embodiment, the vehicle cleaning aperture system 130 cleans a sensor aperture 120. The vehicle cleaning aperture system 130 can be used to clean any aperture (or window) of the vehicle 100 and is not limited to cleaning sensor apertures.

Figure 12:
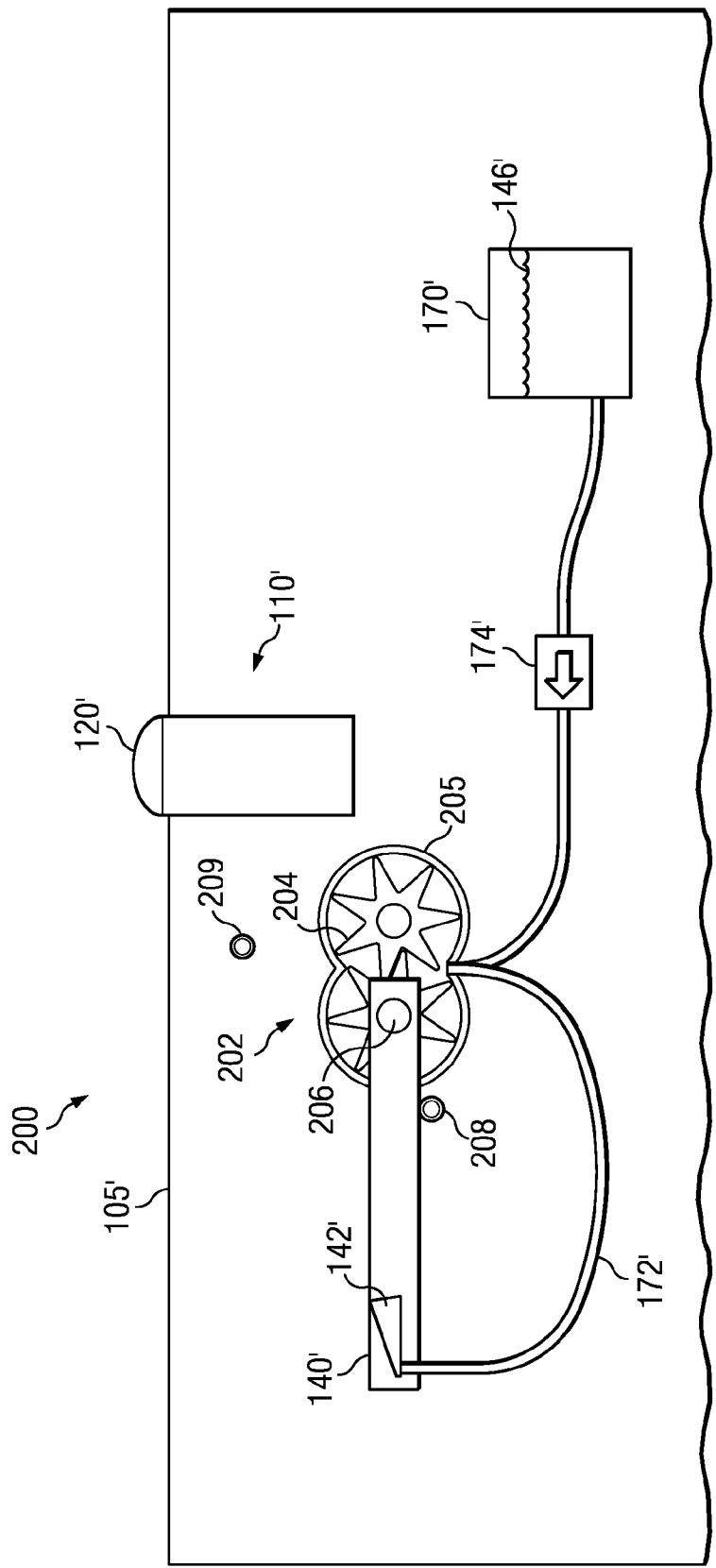
FIG. 12 is a diagrammatic cross-sectional view of a portion of a vehicle that includes a vehicle aperture cleaning system according to another embodiment of the disclosure.

Referring now to FIG. 12, in an alternative embodiment, similar components to those previously described are indicated with a prime (') marking. In this embodiment, a vehicle 200 has a vehicle hull 105' that includes a sensor package 110'. In this embodiment, motion is provided to the fluid dispensing arm 140' by a fluid dispensing arm positioning mechanism 202. The fluid dispensing arm positioning mechanism 202 includes a hydraulic motor 204 in a motor housing 205 with a rotating shaft 206 that rotates the fluid dispensing arm 140'. Position stops 208, 209 may limit the motion of the fluid dispensing arm 140' to a partial turn, for example about 90° in the depicted embodiment. In operation, pressurized fluid 146' flows into the fluid dispensing arm positioning mechanism 202 to operate the hydraulic motor 204. The pressurized fluid 146' then flows from the housing 205 toward the nozzle 142' as previously described. Operation of the hydraulic motor 204 rotates the rotating shaft 206 which causes the fluid dispensing arm 140' to pivot about the shaft from position stop 208 to position stop 209. When the cleaning procedure is complete and the operation of the hydraulic motor 204 is terminated, a biasing member, such as a spiral return spring, may bias the fluid dispensing arm 140' away from the stop 208 toward the stop 206.

The foregoing outlines features of selected embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure, as defined by the claims that follow.

What is claimed is:

1. A sensor aperture cleaning system comprising:
   a substantially linear fluid dispensing arm movable between a stowed position in which the fluid dispensing arm is outside a field of view of a sensor aperture and a cleaning position in which the fluid dispensing arm is disposed within the field of view of the sensor aperture, the fluid dispensing arm including a nozzle;
   a piston mechanism coupled to the fluid dispensing arm between the nozzle and an articulation point adjacent the sensor aperture;
   a housing sized to slidably receive the piston mechanism; and
   a spring disposed within the housing and configured to bias the piston mechanism,
   wherein the piston mechanism is coupled to the fluid dispensing arm and is configured to move the fluid dispensing arm from the stowed position to the cleaning position and compress the spring in response to an increase in pressure on the piston mechanism from a fluid, and
   wherein in the cleaning position, the fluid dispensing arm is configured to pivot about the articulation point adjacent the sensor aperture and the nozzle is configured to spray the fluid at the sensor aperture from multiple angles in response to the fluid dispensing arm pivoting about the articulation point.

2. The sensor aperture cleaning system of claim 1 wherein the fluid dispensing arm is pivotally connected to the piston mechanism.

3. The sensor aperture cleaning system of claim 1 wherein the housing includes an inlet orifice and an outlet orifice arranged to create a through passage when the fluid dispensing arm is in the stowed position.

4. The sensor aperture cleaning system of claim 1 wherein the piston mechanism includes an elongated member in direct coupling with the fluid dispensing arm and a base portion which directly receives the pressure from the fluid.

5. The sensor aperture cleaning system of claim 1 wherein the spring is configured to move the fluid dispensing arm from the cleaning position to the stowed position with the reduction of pressure from the fluid on the piston mechanism.

6. The sensor aperture cleaning system of claim 1 further comprising a first fluid reservoir configured to contain at least a portion of the fluid.

7. The sensor aperture cleaning system of claim 6 further comprising a second fluid reservoir configured to contain a second fluid.

8. The sensor aperture cleaning system of claim 1 wherein the sensor aperture is an electro-optical sensor aperture.

9. A method of cleaning a sensor aperture comprising:
   providing a substantially linear fluid dispensing arm movable between a stowed position in which the fluid dispensing arm is outside a field of view of a sensor aperture and a cleaning position in which the fluid dispensing arm is disposed within the field of view of the sensor aperture, the fluid dispensing arm including a nozzle;
   providing a fluid dispensing arm positioning mechanism including a piston mechanism and a spring, both extending within a housing and the piston mechanism being coupled to the fluid dispensing arm between the nozzle and an articulation point adjacent the sensor aperture;
   conveying a pressurized liquid into the housing;
   overcoming a bias of the spring to compress the spring and move the piston mechanism by applying a force with the pressurized fluid against the piston mechanism;
   responsive to the movement of the piston mechanism, moving the fluid dispensing arm from the stowed position to the cleaning position;
   pivoting the fluid dispensing arm in the cleaning position about the articulation point adjacent to the sensor aperture; and
   spraying the pressurized fluid from the nozzle of the fluid dispensing arm toward the sensor aperture from multiple angles in response to pivoting the fluid dispensing arm.

10. The method of claim 9 further comprising:
    reducing the force applied by the pressurized fluid against the piston mechanism; and
    responsive to the reduced force, moving the fluid dispensing arm from the cleaning position to the stowed position.

11. The method of claim 9 wherein the housing includes inlet and outlet orifices in the housing and the method further includes conveying the pressurized fluid through the inlet orifice, into the housing, and through the outlet orifice, out of the housing while moving the piston mechanism.

* * * * *